(12) United States Patent
Oda

(10) Patent No.: US 8,370,810 B2
(45) Date of Patent: Feb. 5, 2013

(54) DEBUGGING DEVICE AND DEBUGGING METHOD

(75) Inventor: Yuichi Oda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1113 days.

(21) Appl. No.: 12/273,934

(22) Filed: Nov. 19, 2008

(65) Prior Publication Data

US 2009/0144705 A1 Jun. 4, 2009

(30) Foreign Application Priority Data

Nov. 29, 2007 (JP) ................................. 2007-309260

(51) Int. Cl.
*G06F 9/44* (2006.01)
*G06F 11/00* (2006.01)

(52) U.S. Cl. ..................... 717/125; 717/124; 714/38.1

(58) Field of Classification Search .......... 717/124–135; 714/37, 38.1
See application file for complete search history.

(56) References Cited

U.S. PATENT DOCUMENTS

| | | | |
|---|---|---|---|
| 6,681,343 B1 | 1/2004 | Nakabo | |
| 6,961,924 B2 * | 11/2005 | Bates et al. | 717/125 |
| 6,964,036 B2 | 11/2005 | Bates et al. | |
| 7,028,291 B2 * | 4/2006 | Sumida et al. | 717/128 |
| 7,231,633 B2 * | 6/2007 | Grassens | 717/124 |
| 7,328,426 B2 * | 2/2008 | Cosimo et al. | 717/113 |
| 7,506,313 B2 * | 3/2009 | Bates et al. | 717/125 |
| 2003/0028860 A1 * | 2/2003 | Sumida et al. | 717/125 |
| 2003/0167459 A1 * | 9/2003 | Bates et al. | 717/125 |
| 2003/0221185 A1 * | 11/2003 | Bates et al. | 717/125 |
| 2003/0221186 A1 * | 11/2003 | Bates et al. | 717/125 |
| 2004/0003383 A1 | 1/2004 | Chenier | |
| 2004/0030963 A1 * | 2/2004 | Ungar | 714/46 |
| 2005/0015751 A1 * | 1/2005 | Grassens | 717/130 |
| 2005/0039164 A1 * | 2/2005 | Cosimo et al. | 717/110 |
| 2005/0273770 A1 * | 12/2005 | Eichenberger et al. | 717/136 |
| 2005/0283765 A1 * | 12/2005 | Warren et al. | 717/131 |
| 2006/0179352 A1 * | 8/2006 | Lau et al. | 714/38 |
| 2007/0078538 A1 * | 4/2007 | Kawakami et al. | 700/87 |
| 2008/0270760 A1 | 10/2008 | Oda | |

FOREIGN PATENT DOCUMENTS

| | | |
|---|---|---|
| JP | 4-106633 | 4/1992 |
| JP | 8-63369 | 3/1996 |
| JP | 9-128246 | 5/1997 |
| JP | 3107151 | 9/2000 |
| JP | 2001-60161 | 3/2001 |
| JP | 2001-134462 | 5/2001 |
| JP | 2002-288004 | 10/2002 |

OTHER PUBLICATIONS

Kellomaki, Pertti, "Psd—a Portable Scheme Debugger," Jan. 1993, ACM, p. 15-23.*
Office Action issued May 17, 2011, in Japanese Patent Application No. 2007-309260.

* cited by examiner

*Primary Examiner* — Wei Zhen
*Assistant Examiner* — Qing Chen
(74) *Attorney, Agent, or Firm* — Oblon, Spivak, McClelland, Maier & Neustadt, L.L.P.

(57) ABSTRACT

A debugging device configured to debug a program includes an analysis section configured to analyze information of a code that does not need to be debugged in which a predetermined processing instruction is described, the code being generated by optimization of a compiler for a source code of the program, and an output section configured to output processing content information, a start address, and an end address of the code that does not need to be debugged which are obtained by the analysis.

14 Claims, 13 Drawing Sheets

FIG.7

```
        44:   for(i = 0; i < count; i++){

0x891a58 ec1c0138_00000000 blti $12, 0x0001, 0x00000270
             +C1NOP
   ▷ 0x891a60 6cfc0000_00000000 add $12, 0xffffffff
   ▷         +C0NOP
   ▷         +C1NOP
```

30 points to the ▷ markers.

Beginning of align and alias check.  ---- 21

```
     0x891a68 cac0000a_00000000 add3 $10, $12, 0x00000001
             +C1NOP

<SNIP>

0x891b00 e0040074_00000000 bnei $0, 0x0000, 0x000000e8
             +C1NOP
```

Ending of align and alias check.  ---- 22

```
     L50005:
     0x891b08 c910fff8_00000000 add3 $9, $1, 0xfffffff8
             +C1NOP

<SNIP> xg0 = *pg++;
```

FIG.8

```
     44:   for(i = 0; i < count; i++){

0x891a58 ec1c0138_00000000 blti $12, 0x0001, 0x00000270
           +C1NOP
▷  0x891a60 6cfc0000_00000000 add $12, 0xffffffff
▷          +C0NOP
▷          +C1NOP
```
┌─────────────────────────────────────────┐
│ Hiding align and alias check.           │---23
└─────────────────────────────────────────┘
```
   L50005:
   0x891b08 c910fff8_00000000 add3 $9, $1, 0xfffffff8
           +C1NOP
   <SNIP>
           xg0 = *pg++;
```

FIG.9

```
         44:   for(i = 0; i < count; i++){

0x891a58 ec1c0138_00000000 blti $12, 0x0001, 0x00000270
       +C1NOP
0x891a60 6cfc0000_00000000 add $12, 0xffffffff
       +C0NOP
       +C1NOP Beginning of align and alias check.

▷ 0x891a68 cac0000a_00000000 add3 $10, $12, 0x00000001
▷        +C1NOP

<SNIP>

0x891b00 e0040074_00000000 bnei $0, 0x0000, 0x000000e8
       +C1NOP

Ending of align and alias check.

L50005:
0x891b08 c910fff8_00000000 add3 $9, $1, 0xfffffff8
       +C1NOP

<SNIP> xg0 = *pg++;
```

FIG.10

```
        44:   for(i = 0; i < count; i++){

0x891a58 ec1c0138_00000000 blti $12, 0x0001, 0x00000270
        +C1NOP
0x891a60 6cfc0000_00000000 add $12, 0xffffffff
        +C0NOP
        +C1NOP Hiding align and alias check.

L50005:
▷ 0x891b08 c910fff8_00000000 add3 $9, $1, 0xfffffff8
▷       +C1NOP
<SNIP>
            xg0 = *pg++;
```

FIG.11

```
         44:   for(i = 0; j < h; j++){

0x810298 eb1c007c_00000000 blti $11, 0x0001, 0x000000f8
           +C1NOP
▷  0x8102a0 6cfc0000_00000000 add $11, 0xffffffff
▷          +C0NOP
▷          +C1NOP
```

> Beginning of alias check. ---24

```
   0x8102a8 c4b00001_00000000 add3 $4, $11, 0x00000001
           +C1NOP

<SNIP>

0x8102f0 e0040074_00000000 bnei $0, 0x0000, 0x000000e8
           +C1NOP
```

> Ending of alias check. ---25

```
   L50007:
   0x8102f8 0b040000_00000000 sub $11, $0
           +C0NOP
           +C1NOP <SNIP>
           unsigned char c;
```

FIG.12

```
         24:  int main()
         25:  {

0x810168 cff0ffd8  add3  $15, $15, 0xffffffd8
▷  0x81016c 701a      ldc   $0, 0x0001
```

┌──────────────────────────────────────────────┐
│ Beginning of save register contents.         │ --- 26
└──────────────────────────────────────────────┘

```
   0x81016e 4d26      sw    $13, 0x0024($sp)

<SNIP>

0x810178 4012      sw    $0, 0x0010($sp)
```

┌──────────────────────────────────────────────┐
│ Ending of save register contents.            │ --- 27
└──────────────────────────────────────────────┘

```
                     int a = 1;
```

FIG.13

▷ 0x81015c 0c00    mov    $12, $0

19:   switch(calc){

┌─────────────────────────────────────────┐
│ Beginning of reference to branch table. │ --- 28
└─────────────────────────────────────────┘

0x81015e 6c55    sltu3    $0, $12, 0x0a

<SNIP>

0x810168 0c0e    lw    $12, ($0)

┌─────────────────────────────────────────┐
│ Ending of reference to branch table.    │ --- 29
└─────────────────────────────────────────┘

0x81016a 10ce    jmp    $12

20: case 0:

DEBUGGING DEVICE AND DEBUGGING METHOD

CROSS REFERENCE TO RELATED APPLICATION

This application is based upon and claims the benefit of priority from the prior Japanese Patent Application No. 2007-309260 filed on Nov. 29, 2007; the entire contents of which are incorporated herein by this reference.

BACKGROUND OF THE INVENTION

1. Field of the Invention

The present invention relates to a debugging device and a debugging method, and particularly to a debugging device and a debugging method which debug a program.

2. Description of the Related Art

Conventionally, in creating a program, debugging is performed using a debugging device in order to check whether or not the program operates correctly. The debugging device receives as input an object program generated by a compiling device, and displays a corresponding source code or assembly code on a graphical user interface (hereinafter referred to as GUI).

The debugging device has functions of performing break point setting, step execution, and the like. For example, a debugging operator performs step execution using the GUI, the debugging device executes one line of the source code or one instruction of the assembly code. Then, if there is a problematic code which leads to an error in a result of execution of the one instruction of the source code or assembly code, the debugging device highlights a problematic portion or displays an auxiliary code, message, or the like which represents details of the error. Accordingly, the debugging operator can easily find the problematic code.

Many debugging devices as described above have been proposed. For example, Japanese Patent Application No. 3107151 has proposed a debugging device which displays an auxiliary code, message, or the like in a source code or assembly code while a debugging operator performs debugging.

In this proposal, in a case where a debugging operator performs step execution at source level, if the execution sequence of the source code is changed due to optimization of a compiler, a message for alerting the debugging operator is displayed.

However, while conventional debugging devices can display an auxiliary message in the problematic code as described above, the conventional debugging devices cannot distinguish between information of a code that does not need to be debugged which is generated by optimization of the compiler during debugging and information of a code that needs to be debugged.

In addition, the conventional debugging devices can neither add a massage to a start position and an end position of the distinguished code that does not need to be debugged, nor hide the code itself.

SUMMARY OF THE INVENTION

According to one aspect of the present invention, a debugging device can be provided which debugs a program, the debugging device includes: an analysis section configured to analyze information of a code that does not need to be debugged in which a predetermined processing instruction is described, the code being generated by optimization of a compiler for a source code of the program; and an output section configured to output processing content information, a start address, and an end address of the code that does not need to be debugged which are obtained by analysis.

According to one aspect of the present invention, a debugging device can be provided which debugs a program, the debugging device includes: a display selecting section configured to select display or non-display of a code that does not need to be debugged in which a predetermined processing instruction is described, the code being generated by optimization of a compiler for a source code of the program; and a display processing section configured to, if the display of the code that does not need to be debugged is selected, display a first predetermined message indicating a start and an end of the code that does not need to be debugged immediately before and immediately after the code that does not need to be debugged respectively, and if the non-display of the code that does not need to be debugged is selected, hide the code that does not need to be debugged and display only a second predetermined message indicating that the code that does not need to be debugged is hidden.

BRIEF DESCRIPTION OF THE DRAWINGS

FIG. 7 is a diagram of a display example of a screen in a case where display of the implicitly generated code is selected in step S13 of FIG. 5;

FIG. 8 is a diagram of a display example of a screen in a case where non-display of the implicitly generated code is selected in step S13 of FIG. 5;

FIG. 9 is a diagram of a display example of a screen in a case where a stepi command is executed in a state where an implicitly generated code is being displayed;

FIG. 10 is a diagram of a display example of a screen in a case where the stepi command is executed in a state where an implicitly generated code is not being displayed;

FIG. 11 is a diagram of a display example of a screen which displays an implicitly generated code that is generated when loop unrolling is performed;

FIG. 12 is a diagram of a display example of a screen which displays an implicitly generated code that is generated when register saving is performed; and FIG. 13 is a diagram of a display example of a screen which displays an implicitly generated code that is generated when a branch table is referenced.

DETAILED DESCRIPTION OF THE PREFERRED EMBODIMENTS

Hereinafter, an embodiment of the present invention will be described in detail with reference to the drawings.

Figure 1:
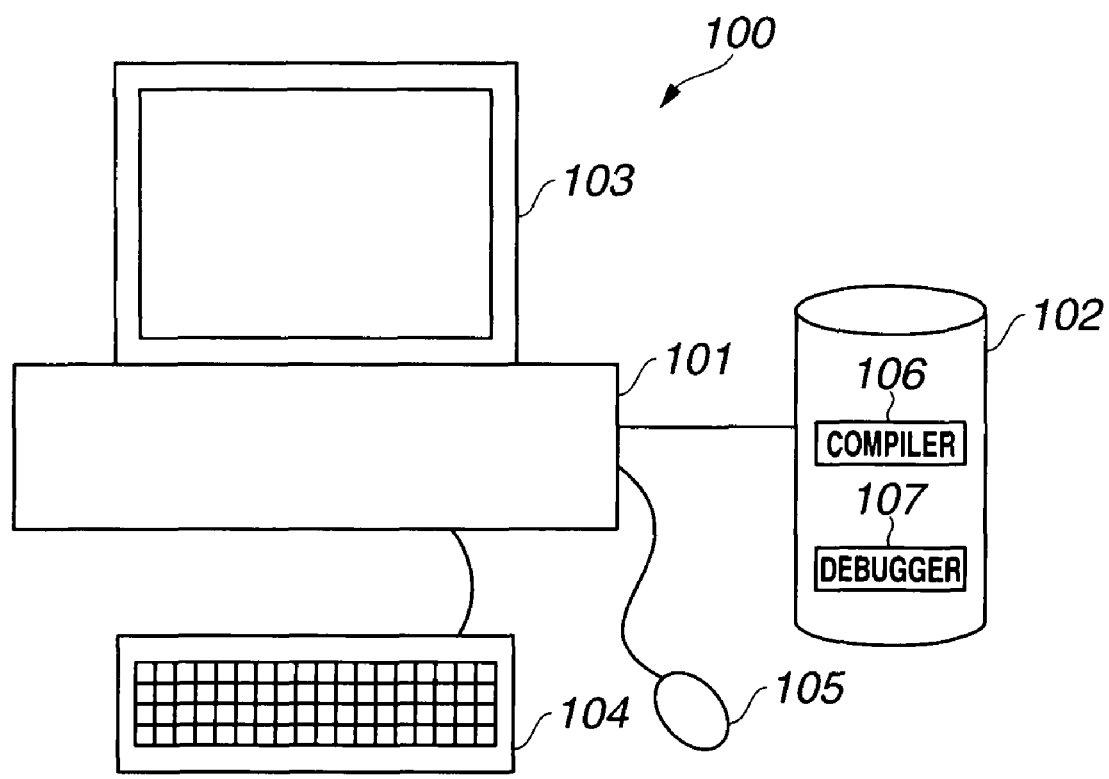
FIG. 1 is a diagram of a configuration of a program generating device including a debugging device according to an embodiment of the present invention.
Figure 2:
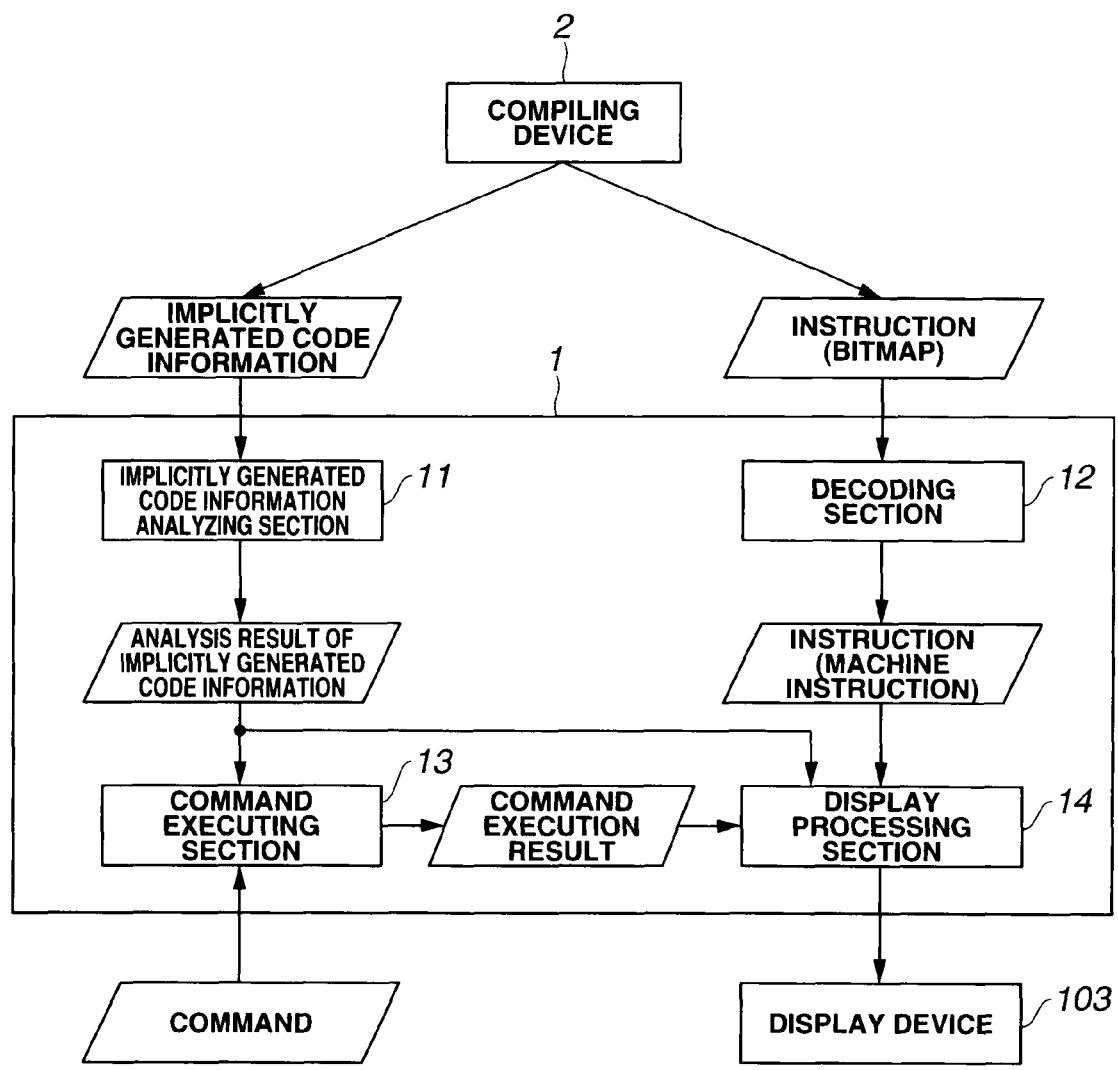
FIG. 2 is a block diagram describing the debugging device according to the present embodiment.

First, a debugging device according to an embodiment of the present invention will be described based on FIGS. 1 and 2. FIG. 1 is a diagram of a configuration of a program generating device including a debugging device according to the present embodiment.

A program generating device 100 is configured to include a main body device 101 having a central processing unit (CPU), a main memory, and the like, a storage device 102 storing various data, and a display device 103 displaying various data.

The main body device 101 is a main body of a computer device such as a personal computer, and is connected with a keyboard 104 and a mouse 105 as input devices. The main body device 101 executes various programs based on instructions from the input devices.

In the storage device 102, a compiler 106 having a program of a compiling function and a debugger 107 having a program of a debugging function are stored.

A user can obtain an object program by running the compiler 106 on the main body device 101 using a source program described in a programming language as an input. In other words, the compiling device is formed of the main body device 101 and the compiler 106.

In addition, the user can perform each debugging as described later by running the debugger 107 on the main body device 101 using an object program obtained by the compiling device as an input. In other words, the debugging device is formed of the main body device 101 and the debugger 107.

The debugging device as configured above according to the present embodiment will now be described. FIG. 2 is a block diagram describing the debugging device according to the present embodiment.

A debugging device 1 is configured to include an implicitly generated code information analyzing section 11, a decoding section 12, a command executing section 13, and a display processing section 14.

The above described compiling device 2 outputs implicitly generated code information described later to the implicitly generated code information analyzing section 11, and also outputs a bitmap sequence of instruction, i.e., an object code to the decoding section 12. Although in FIG. 2 the implicitly generated code information and the object code are shown to be separately outputted for ease of explanation, the implicitly generated code information are stored in a predetermined area object of an object file which contains the object code. The implicitly generated code information analyzing section 11 analyzes the inputted implicitly generated code information, and outputs an analysis result of the analyzed implicitly generated code information to the command executing section 13 and the display processing section 14.

The decoding section 12 decodes the inputted object code to convert the object code to a machine instruction sequence, i.e., an assembly code, and outputs the assembly code to the display processing section 14.

A command for debugging is inputted from a user to the command executing section 13. The user operates a GUI displayed on the display device 103 so that the corresponding command for debugging is inputted to the command executing section 13. The command executing section 13 analyzes the inputted command for debugging, and outputs a command execution result to the display processing section 14. The command executing section 13 also analyzes the inputted analysis result of the implicitly generated code information, and performs processing to set a break point depending on display or non-display of the implicitly generated code as described later.

The display processing section 14 performs display processing based on the inputted assembly code, the analysis result of the implicitly generated code, and the command execution result, and outputs a result of the processing to the display device 103. The display processing section 14 performs processing of display or non-display of the implicitly generated code. The display processing section 14 configures a display selecting section configured to select display or non-display of the implicitly generated code. If the display of the implicitly generated code is selected, a message indicating a processing content and a start position of the implicitly generated code is displayed immediately before a start line of the implicitly generated code, and a message indicating the processing content and an end position of the implicitly generated code is displayed immediately after an end line of the implicitly generated code. If the non-display of the implicitly generated code is selected, a message indicating the processing content of the implicitly generated code and a fact that the implicitly generated code itself is hidden is displayed, and the implicitly generated code itself is hidden.

In addition, the display processing section 14 can switch processing of a step-related command depending on the display or non-display of the implicitly generated code. When the step-related command is executed, if the display of the implicitly generated code has been selected, a program proceeds step by step even in the implicitly generated code. When the step-related command is executed, if the non-display of the implicitly generated code has been selected, the program proceeds to the end of the implicitly generated code. Such a step-related command includes a step command and a stepi command. Hereinafter it is assumed that the step command executes one line of source code and the stepi command executes one instruction of assembly code.

Figure 3:
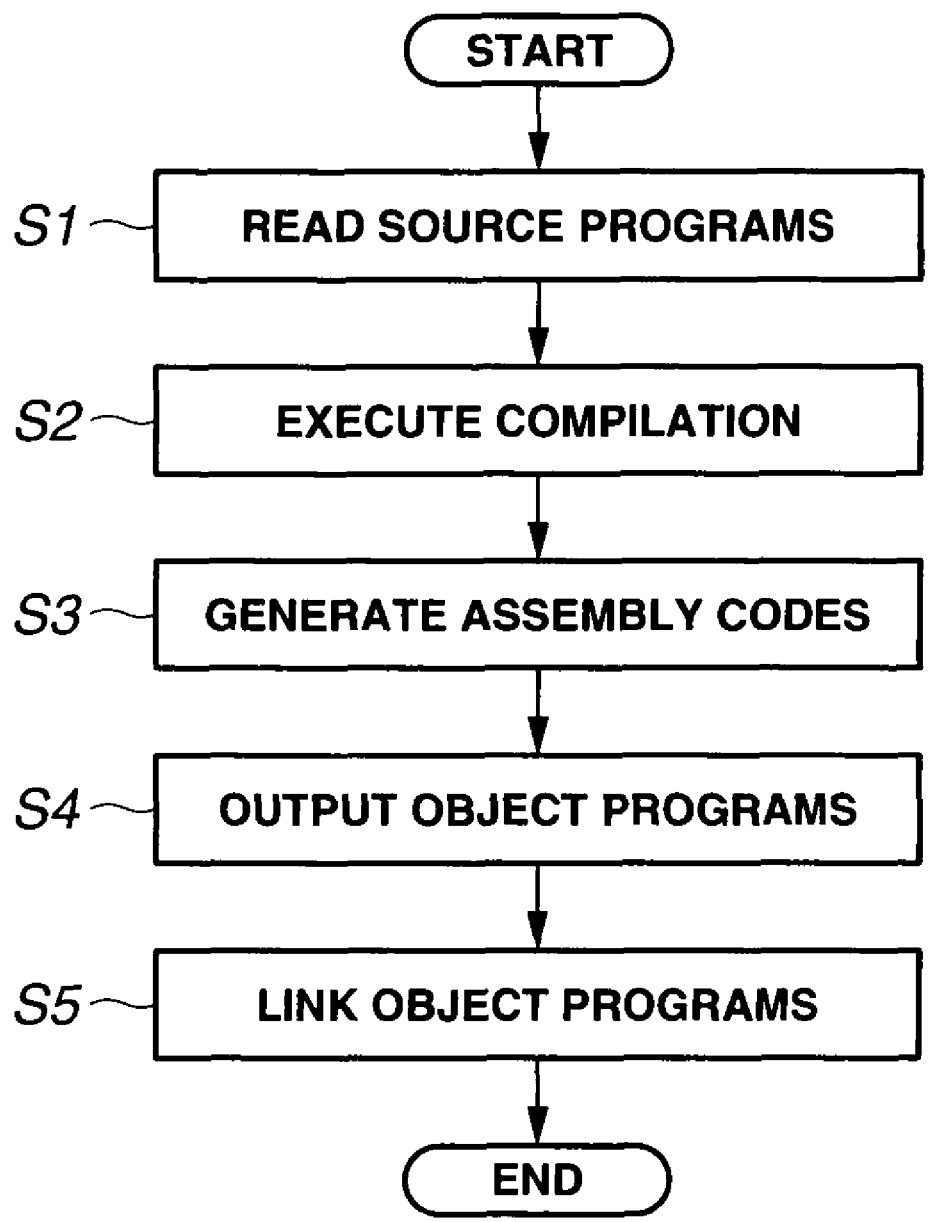
FIG. 3 is a flowchart of an example of a processing flow of a compiling device.

Processing of the compiling device 2 will be described here. FIG. 3 is a flowchart of an example of a processing flow of the compiling device.

First, the compiling device 2 reads source programs (step S1), and execute compilation (step S2). The execution of the compilation in step S2 includes optimization, addition of debug information, addition of implicitly generated code information as described later, and so on. Then, the compiling device 2 generates assembly codes (step S3), and outputs object programs (step S4). Finally, the compiling device 2 links the plural object programs generated by the above described processing (step S5) to generate one executable object program, i.e., an execution module.

When a function of optimization of a compiler is applied, an assembly code that is difficult to be debugged by a user or that does not need to be debugged may be generated. For example, automatic SIMD (Single Instruction Multiple Data) optimization, which is one of parallelization techniques, is performed, the following three assembly codes may be generated. The first is a code configured to dynamically determine whether SIMDization is allowed or not. The second is a SIMDized code, and the third is non-SIMDfied code.

When automatic SIMD optimization is performed and the above described three codes are generated, the code configured to dynamically determine whether SIMDization is allowed or not is executed first. If it is determined by the above code that SIMDization is allowed, the SIMDized code is executed, and if it is determined that SIMDization is not allowed, the non-SIMDized code is executed.

A point a user should note here is not the code configured to dynamically determine whether SIMDization is allowed or not, but is which code (i.e., the SIMDized code or non-SIMDized code) is to be executed. The SIMDized code or non-SIMDized code is a debug target code, and the code configured to dynamically determine whether SIMDization is allowed or not is a code that does not need to be debugged. The code that does not need to be debugged which is generated by optimization of the compiler is defined as an implicitly generated code.

While the code configured to dynamically determine whether SIMDization is allowed or not has been described as one example of the code that does not need to be debugged, the code that does not need to be debugged is a code generated implicitly by the compiling device in order to execute a program correctly. Therefore, if there is a problem in the code, the problem is highly likely to be due to the compiling device itself. Accordingly, it is assumed that a programmer has less need to care the code.

However, it should be noted that such a problem is not necessarily due to the compiling device, and a problem may be contained in an implicitly generated code as described above because of an interaction between a source code described by a programmer and the compiling device. For this reason, it is configured that a code that does not need to be debugged can be also displayed.

In the example of the automatic SIMD optimization, the code configured to dynamically determine whether SIMDization is allowed or not corresponds to the implicitly generated code. This implicitly generated code is a program configured to determine whether to perform processing of SIMD or processing of non-SIMD based on input data and the like. In other words, the implicitly generated code is a code which is generated inside the compiler when the compiler generates a plurality of execution instruction groups with respect to a source code.

For addition of implicitly generated code information, the implicitly generated code information is generated from implicitly generated code which is generated by optimization, and the generated implicitly generated code information is encrypted by a predetermined format and added in a predetermined area in an object program.

If an implicitly generated code generated by complier optimization which is not a debug target is displayed on the GUI, this display obstructs debugging and efficiency of the debugging is expected to decrease.

Therefore, in the present embodiment, implicitly generated code information is analyzed. Then, to an implicitly generated code that is not a debug target is added a message indicating a processing content, and so on of the implicitly generated code, or the implicitly generated code itself is hidden from a user. Thereby, efficiency of debugging is improved.

Figure 4:
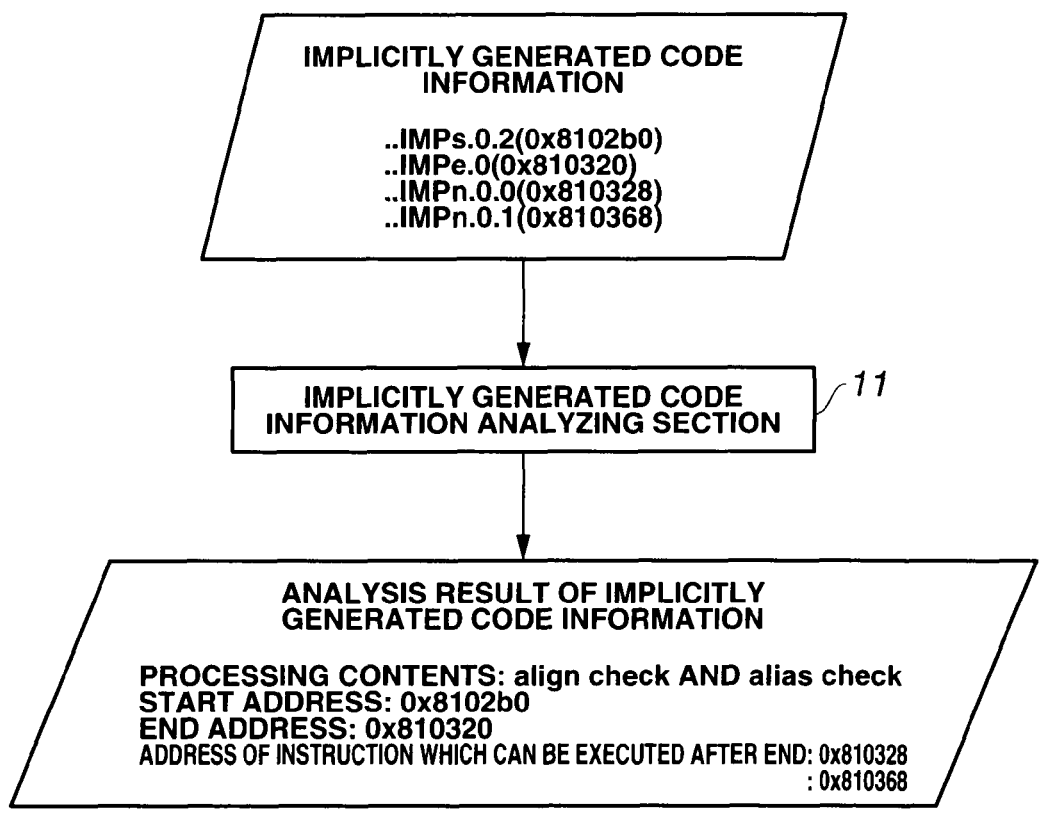
FIG. 4 is a schematic diagram describing an example of processing of an implicitly generated code information analyzing section.

Processing of the implicitly generated code information analyzing section 11 will now be described. FIG. 4 is a schematic diagram describing an example of the processing of the implicitly generated code information analyzing section.

Implicitly generated code information encrypted by a predetermined format is inputted to the implicitly generated code information analyzing section 11. The implicitly generated code information analyzing section 11 analyzes the implicitly generated code information and obtains an analysis result of the implicitly generated code information.

The analysis result of the implicitly generated code information obtained by the implicitly generated code information analyzing section 11 includes a processing content, a start address, and an end address of the implicitly generated code, and an address of instruction which can be executed after the end of the implicitly generated code. In the example of FIG. 4, the analysis result of the implicitly generated code information is information indicating that the processing contents of the implicitly generated code are align check and alias check, the start address of the implicitly generated code is 0x8102b0, the end address of the implicitly generated code is 0x810320, and the address of instruction which can be executed after the end of the implicitly generated code is 0x810328 or 0x810368. The address of instruction which can be executed after the end of the implicitly generated code is a first address of a SIMDized code or a first address of a non-SIMDized code. The command executing section 13 sets a breakpoint at an address of an instruction to be subsequently processed during step execution, and thereby performs processing depending display or non-display of the implicitly generated code as described later.

The analysis result of the implicitly generated code information obtained by the implicitly generated code information analyzing section 11 is inputted to the command executing section 13 and the display processing section 14, and the command executing section 13 and the display processing section 14 perform the above described processing respectively based on the analysis result of the implicitly generated code information.

The implicitly generated code information analyzing section 11 may be configured to display the analysis result of the implicitly generated code information on the display device 103. The implicitly generated code information analyzing section 11 configures the output section configured to output the processing content information, start address, and end address of the implicitly generated code which are obtained by the analysis of the implicitly generated code information. As a result, a user can recognize a processing content, a start position, an end position, and so on of the implicitly generated code, which makes efficiency of debugging improve.

Figure 5:
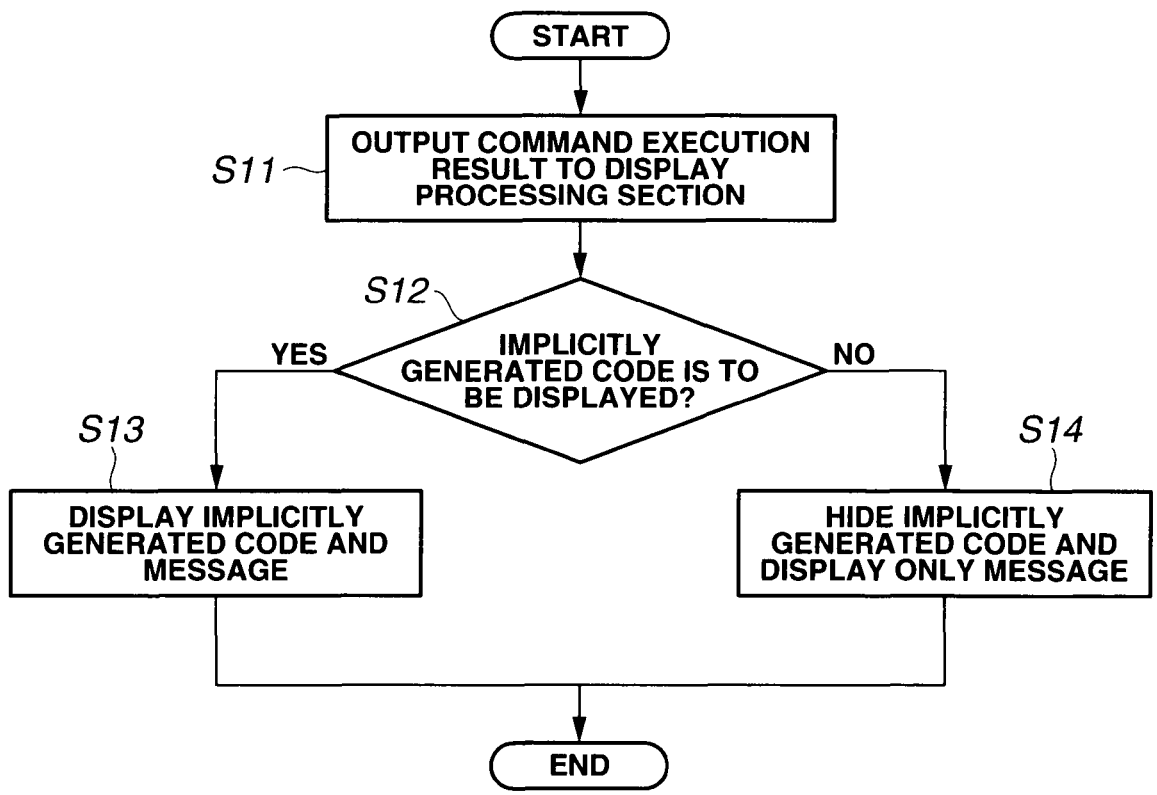
FIG. 5 is a flowchart of an example of a processing flow in a case where display or non-display of an implicitly generated code is selected.

FIG. 5 is a flowchart of an example of a flow of processing in a case where display or non-display of an implicitly generated code is selected. This processing is started when a user operates the GUI of the display device 103 and selects whether or not to display the implicitly generated code.

First, the command executing section 13 analyzes an inputted command and outputs a command execution result to the display processing section 14 (step S11). The display processing section 14 analyzes the command execution result and determines whether or not to display the implicitly generated code (step S12). If it is determined as YES that the implicitly generated code is to be displayed, a message indicating a processing content of the implicitly generated code and a start position or an end position of the implicitly generated code is added immediately before and immediately after the implicitly generated code (step S13).

The processing in step S13 is performed on an assembly code based on an analysis result of the implicitly generated code information. In addition to the command execution result, the analysis result of the implicitly generated code information from the implicitly generated code information analyzing section 11 and the assembly code from the decoding section 12 are inputted to the display processing section 14. The display processing section 14 analyzes the analysis result of the implicitly generated code information to obtain the above described start address, end address, and so on of the implicitly generated code, and adds the predetermined message to a corresponding address position of the assembly code. The assembly code processed in this way is outputted to the display device 103 and displayed on the display device 103.

On the other hand, if it is determined as NO that the implicitly generated code is not to be displayed, the implicitly generated code is hidden, and only a predetermined message indicating the processing content of the implicitly generated code and a fact that the implicitly generated code is hidden is displayed (S14). As in step S13, the processing in step S14 is performed on the assembly code based on the analysis result of the implicitly generated code information.

Figure 6:
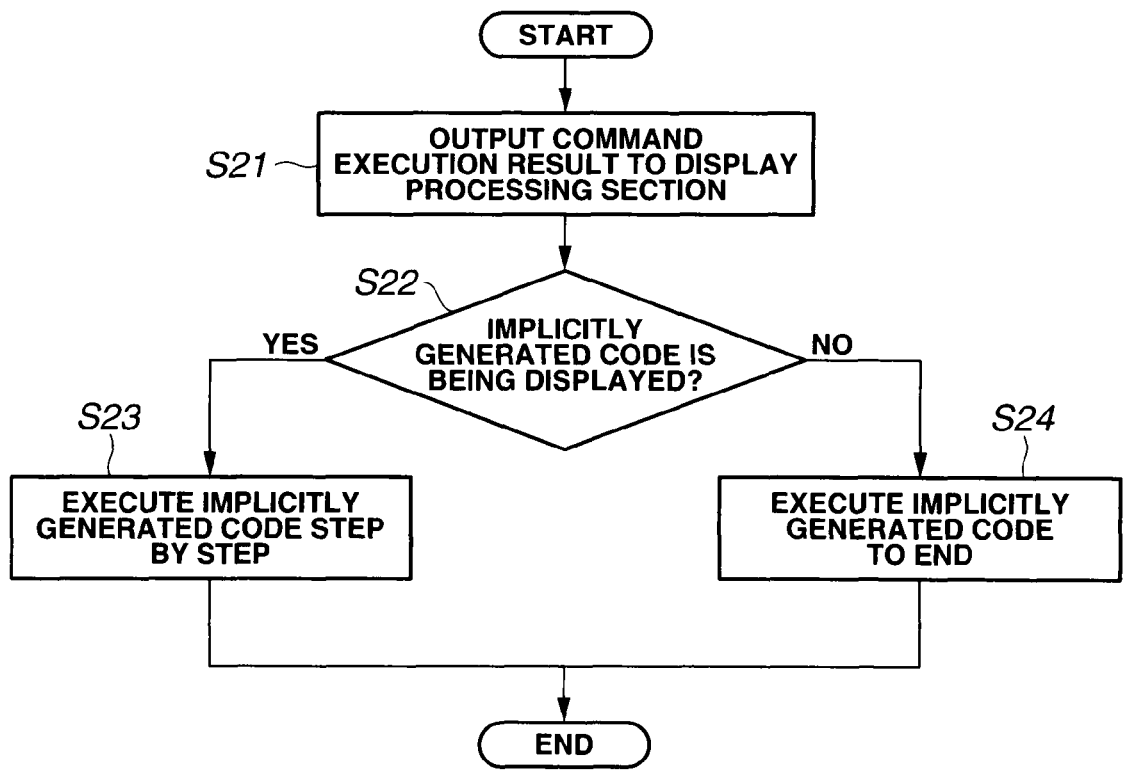
FIG. 6 is a flowchart of an example of a flow of processing to switch processing of a step-related command based on display or non-display of an implicitly generated code.

FIG. 6 is a flowchart of an example of a flow of processing to switch processing of a step-related command based on display or non-display of an implicitly generated code. This processing is started when a user operates the GUI of the display device 103 and executes the stepi command, which is a step-related command.

First, the command executing section 13 analyzes an inputted command and outputs a command execution result to the display processing section 14 (step S21). The display processing section 14 analyzes the command execution result as well as detecting whether or not the implicitly generated code is being displayed (step S22). If the implicitly generated code is being displayed (YES), the implicitly generated code is executed step by step (step S23). If the implicitly generated code is not being displayed (NO), the implicitly generated code is executed to the end (step S24).

FIG. 7 is a diagram of a display example of a screen in a case where display of the implicitly generated code is selected in step S13 of FIG. 5. In FIG. 7, a range from an address 0x891a68 to 0x891b00 corresponds to the implicitly generated code. If display of the implicitly generated code is selected, a portion 21 surrounded by a dotted line is added immediately before the first address 0x891a68 of the implicitly generated code, and a portion 22 surrounded by a dotted line is added immediately after the end address 0x891b00 of the implicitly generated code.

The portion 21 surrounded by the dotted line is a support message indicating a start position and processing contents of the implicitly generated code, and the portion 22 surrounded by the dotted line is a support message indicating an end position and processing contents of the implicitly generated code. A program counter (hereinafter referred to as PC) is stopped at an address 0x891a60. A stop position of the PC is denoted by a triangular mark 30 in FIG. 7, and the same applies hereinafter. Three triangular marks 30 exist in FIG. 7, which indicates that three instructions can be executed at the same time.

FIG. 8 is a diagram of a display example of a screen in a case where non-display of the implicitly generated code is selected in step S13 of FIG. 5. If non-display of the implicitly generated code is selected, the implicitly generated code of FIG. 7 is hidden, and a portion 23 surrounded by a dotted line is added.

The portion 23 surrounded by the dotted line is a support message indicating the processing contents of the implicitly generated code and a fact that the implicitly generated code itself is hidden. The PC is stopped at the address 0x891a60.

FIG. 9 is a diagram of a display example of a screen in a case where the stepi command is executed in a state where an implicitly generated code is being displayed. If the implicitly generated code is being displayed, i.e., in the case of FIG. 7, the PC is stopped at the address 0x891a60. When the stepi command is executed once in this state, a code immediately before the implicitly generated code is executed, and then the PC stops at a beginning of the implicitly generated code, i.e., at the address 0x891a68. Also after that, each time the stepi command is executed, the implicitly generated code is executed step by step.

FIG. 10 is a diagram of a display example of a screen in a case where the stepi command is executed in a state where an implicitly generated code is not being displayed. If the implicitly generated code is not being displayed, i.e., in the case of FIG. 8, the PC is stopped at the address 0x891a60. When the stepi command is executed once in this state, a code immediately before the implicitly generated code is executed, and then the implicitly generated code is executed to the end. As a result, the PC stops immediately after an end of the implicitly generated code, i.e., at an address 0x891b08. Processing for the PC to stop immediately after the end of the implicitly generated code is performed by jumping to the above described breakpoint set by the command executing section 13.

As described above, the debugging device 1 is configured to analyze implicitly generated code information stored in a predetermined area of an object file, and add, to an implicitly generated code that is not a debug target, a support message indicating a processing content and a start position or end position of an implicitly generated code. In addition, the debugging device 1 is configured to hide the implicitly generated code that is not a debug target, and add a support message indicating the processing content of the implicitly generated code and a fact that the implicitly generated code is hidden. As a result, a user can recognize the processing content, start position, and end position of the implicitly generated code that is not a debug target, or hide the implicitly generated code itself that is not a debug target.

As described above, by adding a message to a start position and an end position of an implicitly generated code, a user does not need to carefully read the implicitly generated code even if the implicitly generated code is displayed. In addition, by hiding an internally message itself from the user, an amount of assembly code to be read by the user can be reduced.

Thus, according to the debugging device of the present embodiment, information of a code that does not need to be debugged can be distinguished from information of a code that needs to be debugged. In addition, a message is added to a start position and an end position of the code that does not need to be debugged, or the code that does not need to be debugged itself is hidden, which makes efficiency of debugging improve.

Next, applications of the present embodiment will be described.

Although an implicitly generated code which is generated by the automatic SIMD optimization has been described in the above described embodiment, the embodiment may be applied to an implicitly generated code from other than the automatic SIMD optimization.

FIG. 11 is a diagram of a display example of a screen which displays an implicitly generated code that is generated when loop unrolling is performed. In FIG. 11, a range from an address 0x8102a8 to an address 0x8102f0 corresponds to the implicitly generated code that is generated when loop unrolling is performed. This implicitly generated code is a program for determining whether or not loop unrolling can be performed, and is a code that does not need to be debugged. If display of the implicitly generated code is selected, a portion 24 surrounded by a dotted line is added immediately before the first address 0x8102a8 of the implicitly generated code, and a portion 25 surrounded by a dotted line is added immediately after the end address 0x8102f0 of the implicitly generated code. The PC is stopped at an address 0x8102a0.

FIG. 12 is a diagram of a display example of a screen which displays an implicitly generated code that is generated when register saving is performed. In FIG. 12, a range from an address 0x81016e to an address 0x810178 corresponds to the implicitly generated code that is generated by the compiler when register saving is performed, and is a portion that does not need to be debugged. If display of the implicitly generated code is selected, a portion 26 surrounded by a dotted line is added immediately before the first address 0x81016e of the implicitly generated code, and a portion 27 surrounded by a dotted line is added immediately after the end address 0x810178 of the implicitly generated code. The PC is stopped at an address 0x81016c.

FIG. 13 is a diagram of a display example of a screen which displays an implicitly generated code that is generated when a branch table is referenced. In FIG. 13, a range from an address 0x81015e to an address 0x810168 corresponds to the implicitly generated code that is generated by the compiler when the branch table is referenced, and is a portion that does not need to be debugged. If display of the implicitly generated code is selected, a portion 28 surrounded by a dotted line is added immediately before the first address 0x81015e of the implicitly generated code, and a portion 29 surrounded by a dotted line is added immediately after the end address 0x810168 of the implicitly generated code. The PC is stopped at an address 0x81015c.

Although examples in which an implicitly generated code is displayed have been described in the applications, an implicitly generated code may not be displayed as in the above described embodiment. Further, as in the above described embodiment, processing of a step-related command can be switched based on a state of display or non-display of an implicitly generated code.

Each "section" as used herein is a conceptual section corresponding to a respective function of the embodiment, and does not necessarily corresponds to specific hardware or software routine on a one-for-one basis. Thus, in this specification, the embodiment has been described on the assumption of virtual circuit blocks (sections) each having a function of the embodiment. In addition, the above described steps in each flowchart may be executed in a different sequence even for each execution of the steps or some of the steps may be executed at the same time without departing from the nature of the steps.

A program to execute the above described operation is recorded or stored as a computer program product in a portable medium such as a flexible disk or a CD-ROM, a storage device such as a hard disk, or the like in whole or part. The program is read by a computer and a whole or part of the operation is executed. Alternatively, a whole or part of the program may be distributed or provided through a communication network. A user can download and install the program in a computer through the communication network or install the program from a recording medium into the computer, so that the debugging device of the present invention can be easily implemented.

The present invention is not limited to the above described embodiment, and various changes and modifications may be made without changing the principle of the present invention.

What is claimed is:

1. A non-transitory computer-readable medium storing a debug program that causes a computer to execute debugging of a program, the debug program comprising:
   a display selecting instruction to select display or non-display of a code that does not need to be debugged in which a predetermined processing instruction is described, wherein the code that does not need to be debugged is generated by optimization of a compiler for a source code of the program; and
   a display processing instruction to, if the display of the code that does not need to be debugged is selected, display a first predetermined message indicating a start and an end of the code that does not need to be debugged immediately before and immediately after the code that does not need to be debugged respectively, and if the non-display of the code that does not need to be debugged is selected, hide the code that does not need to be debugged and display only a second predetermined message indicating that the code that does not need to be debugged is hidden.

2. The non-transitory computer-readable medium according to claim 1, wherein during step execution, if the non-display of the code that does not need to be debugged has been selected, the display processing instruction executes the step execution to the end of the code that does not need to be debugged.

3. The non-transitory computer-readable medium according to claim 1, wherein if the non-display of the code that does not need to be debugged is selected, the display processing instruction adds a message indicating a processing content of the code that does not need to be debugged to the second predetermined message, and displays the message added to the second predetermined message.

4. The non-transitory computer-readable medium according to claim 1, further comprising a command executing instruction to perform analysis of a command for debugging,
   wherein the display selecting instruction selects the display or the non-display of the code that does not need to be debugged based on a result of the analysis from the command executing instruction.

5. The non-transitory computer-readable medium according to claim 4,
   wherein the command executing instruction sets a breakpoint at the end of the code that does not need to be debugged during step execution, and
   wherein during the step execution, the display processing instruction executes the step execution to the end of the code that does not need to be debugged based on the set breakpoint.

6. The non-transitory computer-readable medium according to claim 1, further comprising a decoding instruction to convert an object code generated by the compiler to an assembly code,
   wherein the display processing instruction displays the first and second predetermined messages on the assembly code.

7. The non-transitory computer-readable medium according to claim 1, wherein the code that does not need to be debugged is a code configured to dynamically determine whether SIMDization is allowed or not, wherein the code is generated by SIMD (Single Instruction Multiple Data) optimization.

8. A debugging method configured to debug a program, the debugging method comprising:
   selecting display or non-display of a code that does not need to be debugged in which a predetermined processing instruction is described, wherein the code that does not need to be debugged is generated by optimization of a compiler for a source code of the program; and
   if the display of the code that does not need to be debugged is selected, displaying a first predetermined message indicating a start and an end of the code that does not need to be debugged immediately before and immediately after the code that does not need to be debugged respectively, and if the non-display of the code that does not need to be debugged is selected, hiding the code that does not need to be debugged and displaying only a second predetermined message indicating that the code that does not need to be debugged is hidden.

9. The debugging method according to claim 8, further comprising:

during step execution, if the non-display of the code that does not need to be debugged has been selected, executing the step execution to the end of the code that does not need to be debugged.

10. The debugging method according to claim 9, further comprising:
setting a breakpoint at the end of the code that does not need to be debugged during the step execution; and
during the step execution, executing the step execution to the end of the code that does not need to be debugged based on the set breakpoint.

11. The debugging method according to claim 8, further comprising:
if the non-display of the code that does not need to be debugged is selected, adding a message indicating a processing content of the code that does not need to be debugged to the second predetermined message; and
displaying the message added to the second predetermined message.

12. The debugging method according to claim 8, further comprising:
performing analysis of a command for debugging; and
selecting the display or the non-display of the code that does not need to be debugged based on a result of the analysis.

13. The debugging method according to claim 8, further comprising:
converting an object code generated by the compiler to an assembly code; and
displaying the first and second predetermined messages on the assembly code.

14. The debugging method according to claim 8, wherein the code that does not need to be debugged is a code configured to dynamically determine whether SIMDization is allowed or not, wherein the code is generated by SIMD (Single Instruction Multiple Data) optimization.

* * * * *